US006603216B2

(12) United States Patent
Costello

(10) Patent No.: US 6,603,216 B2
(45) Date of Patent: Aug. 5, 2003

(54) EXCITER CIRCUIT WITH FERRO-RESONANT TRANSFORMER NETWORK FOR AN IGNITION SYSTEM OF A TURBINE ENGINE

(75) Inventor: John Joseph Costello, Pickens, SC (US)

(73) Assignee: Champion Aerospace Inc., Liberty, SC (US)

(*) Notice: Subject to any disclaimer, the term of this patent is extended or adjusted under 35 U.S.C. 154(b) by 70 days.

(21) Appl. No.: 09/974,074

(22) Filed: Oct. 10, 2001

(65) Prior Publication Data

US 2003/0067284 A1 Apr. 10, 2003

(51) Int. Cl.$^7$ ............................................. H01T 15/00
(52) U.S. Cl. ........................ 290/41; 290/40 R; 322/37; 123/601
(58) Field of Search ............................ 290/40 R, 41, 290/40 A, 40 B; 322/37, 38; 123/601

(56) References Cited

U.S. PATENT DOCUMENTS

| 5,053,913 A | * 10/1991 | Lozito et al. ................ 361/257 |
| 5,399,942 A | * 3/1995 | Frus ........................ 315/209 R |
| 5,473,502 A | * 12/1995 | Bonavia et al. ............. 361/256 |
| 5,488,536 A | * 1/1996 | Bonavia et al. ............. 361/253 |
| 5,510,952 A | * 4/1996 | Bonavia et al. ............. 361/251 |
| 5,561,350 A | 10/1996 | Frus et al. ................ 315/209 R |
| 5,654,868 A | * 8/1997 | Buer ........................... 361/256 |
| 5,852,381 A | 12/1998 | Wilmont et al. ............. 327/440 |
| 5,862,033 A | 1/1999 | Geislinger et al. .......... 361/257 |
| 6,081,074 A | * 6/2000 | Frus et al. ............. 315/209 CD |
| 2002/0170548 A1 | * 11/2002 | Masters et al. ............. 123/641 |

* cited by examiner

*Primary Examiner*—Nicholas Ponomarenko
(74) *Attorney, Agent, or Firm*—Reising, Ethington, Barnes, Kisselle, P.C.

(57) ABSTRACT

An exciter circuit for firing one or more igniter plugs in an aircraft ignition system. The exciter circuit includes an input node capable of receiving an alternating-current (AC) voltage with a variable frequency and amplitude, a pair of tank capacitors used as energy storage devices, a charging circuit for charging the tank capacitors, a discharge circuit for providing spark energy from the capacitors to two igniters, and a spark gap to initiate the discharge once the capacitors have been charged to a sufficient voltage. The charging circuit includes a step-up ferro-resonant transformer network and a full-wave rectifier. The transformer network includes a saturating transformer, a choke coil in series with the transformer primary, and one or more tuning capacitors connected to a center tap on the primary. The relative values of inductance of the choke coil and transformer primary and the capacitance of the tuning capacitors is set to provide a resonant frequency that is equal to the nominal frequency of the AC input power. The transformer primary is designed to saturate during normal operation. With this arrangement, the exciter exhibits good regulation of input current and spark rate over a wide range of input amplitudes and frequencies.

26 Claims, 1 Drawing Sheet

… … …

EXCITER CIRCUIT WITH FERRO-RESONANT TRANSFORMER NETWORK FOR AN IGNITION SYSTEM OF A TURBINE ENGINE

TECHNICAL FIELD

The present invention generally relates to exciter circuits used for firing igniter plugs in aircraft and other turbine engine ignition systems.

BACKGROUND OF THE INVENTION

Gas turbine engine ignition systems typically include an exciter circuit that generates the discharge energy used to fire the igniter plugs (igniters) in the engine. These circuits are commonly used within the aviation industry, but are not limited to aircraft turbine engines. For example, gas turbine generators and other small turbine engines will typically utilize exciter circuits to provide spark energy to one or more igniter plugs. Many exciter circuits in use today utilize a transformer to step-up an input voltage received from a power supply into a controlled succession of high-voltage ionization pulses. The high-voltage nature of these ionization pulses is necessary to successfully cause an ionization current to arc across the air gap between the electrodes of each igniter plug. In this way, each igniter plug is able to properly spark or fire to thereby produce combustion of the fuel in the engine. The specific rate at which an igniter plug is fired in this manner is commonly referred to as the spark rate.

Both inductive and capacitive discharge exciter circuits are known and each generally includes a charging circuit, one or more energy storage devices, and a discharge circuit. For inductive exciter circuits, a transformer is used as the energy storage device, with the energy being stored in a magnetic field produced by driving current through the transformer primary. The energy is periodically delivered to the igniter via the transformer secondary by periodically interrupting the primary current using, for example, a transistor switch in series with the primary, thereby causing transformer flyback which uses the stored magnetic field to generate a high voltage pulse on the secondary.

For capacitive discharge exciters, the energy storage device is a tank capacitor, which is a capacitor having a relatively large charge storage capacity. This capacitor is used to store the spark energy for subsequent delivery to the igniter plug, and can be located at the transformer secondary where it receives high voltage charging current from the transformer. Once the capacitor has been charged up to a predetermined voltage level sufficient for firing the igniter plug, the accumulated charge in the capacitor is discharged through the igniter plug to thereby produce the desired arc for combustion of the fuel. Discharge of the capacitor can be controlled in a known manner using a switch device such as a spark gap within the exciter circuit.

In many capacitive discharge exciter circuits that are powered with an alternating-current (AC) input voltage onboard an aircraft, the charging circuits often include a linear-type transformer in combination with a voltage multiplier for stepping up an input voltage. The voltage multiplier itself is commonly a voltage doubler, such as a cascade-type voltage doubler, that includes two rectifying diodes.

The use of such circuits can be problematic where good regulation of the AC supply is not provided. For example, in aviation applications, the aircraft power system may nominally supply power of 115 VAC at 400 Hertz, with up to about 20% variation in amplitude and frequency being possible. For conventional capacitive discharge exciter circuits that utilize a linear transformer with voltage doubler, these input AC supply variations can result in widely varying input currents and spark rates. Testing of such circuits has shown that the input current can vary from, for example, 0.5 to 5 amps, with the spark rate varying from 1 to 15 sparks per second. Where spark rates of only say 1–3 sparks per second are desired, such higher input currents and spark rates can be undesirable, resulting in reduced operating life of the igniter plugs and perhaps even the exciter circuit itself.

SUMMARY OF THE INVENTION

The present invention provides an exciter circuit for firing one or more igniter plugs in an ignition system suitable for operating one or more gas turbine engines on, for example, an aircraft.

In accordance with one aspect of the invention, there is provided an exciter that includes an energy storage device, charging circuit, and discharge circuit. The charging circuit receives input power and stores energy in the energy storage device for subsequent delivery to an igniter via the discharge circuit. The charging circuit has an input, an output, and a ferro-resonant transformer network that includes a saturating transformer with a primary winding connected to the input and a secondary winding connected to the output. Operating power received by the charging circuit via the input is stored in the energy storage device. The discharge circuit has a high voltage output connected to receive spark energy from the energy storage device and this can be by way of a switch device such as a spark gap. The transformer network in the charging circuit includes an inductive coil in series with the primary winding and a capacitor connected to the primary winding. The ferro-resonant transformer network has a resonant frequency that is determined at least in part by the inductance of the coil and the capacitance of the capacitor. The transformer is designed such that, during operation of the exciter circuit, current flow through the coil and the primary causes saturation of the transformer. In this way, the input current used by the exciter can be controlled and limited.

In accordance with another aspect of the invention, there is provided an exciter circuit that includes an input node capable of receiving an alternating-current (AC) voltage with a variable frequency and a variable amplitude, one or more storage devices capable of storing an electric charge, and a charging circuit capable of electrically charging up the one or more storage devices. The charging circuit itself includes a step-up ferro-resonant transformer network and a full-wave rectifier. The step-up ferro-resonant transformer network is electrically connected between the input node and the full-wave rectifier, and the full-wave rectifier is electrically connected between the step-up ferro-resonant transformer network and the one or more storage devices. In addition, the exciter circuit also basically includes a discharge circuit and a switch device. The discharge circuit is electrically connected to the one or more storage devices and is also electrically connectable to the one or more igniter plugs. The switch device is electrically connected to either or both of the one or more storage devices and the discharge circuit. In such a configuration, whenever the one or more storage devices are charged by the charging circuit to a predetermined charge level sufficient for firing the one or more igniter plugs, the switch device is capable of enabling the discharging of the one or more storage devices through the discharge circuit and also the firing of the one or more igniter plugs.

In the disclosed embodiment of the present invention, the step-up ferro-resonant transformer network includes a choke coil, a step-up transformer, and one or more capacitors. The choke coil is preferably a tunable, ferromagnetic-core inductor and has both a first end and a second end. The first end of the choke coil is electrically connected to the input node. The step-up transformer has a ferromagnetic core, a primary winding wrapped about the ferromagnetic core, and a secondary winding wrapped about the ferromagnetic core as well. The primary winding has a first end electrically connected to the second end of the choke coil and a second end electrically connectable to electrical ground. The secondary winding, on the other hand, has a first end and a second end that are both electrically connected to the full-wave rectifier. The one or more capacitors are tapped into the primary winding of the step-up transformer such that the one or more capacitors are electrically connectable between the primary winding and electrical ground. In such a configuration, at least one of the one or more capacitors is preferably a tuning capacitor.

Also, in the disclosed embodiment of the present invention, the discharge circuit includes one or more bleeder resistors and also one or more pulse-forming networks. The one or more bleeder resistors are electrically connected to the one or more storage devices. The one or more pulse-forming networks are electrically connected to the one or more bleeder resistors and are also electrically connectable to the one or more igniter plugs. In such a configuration, each pulse-forming network is preferably an inductor-capacitor peaking network.

Furthermore, in the disclosed embodiment of the present invention, each storage device is a tank capacitor, and the switch device is a spark gap device. The full-wave rectifier is preferably a bridge-type rectifier wherein four rectifying diodes are electrically connected together in a bridge configuration.

When compared with certain conventional capacitive discharge exciter circuits, the exciter circuit disclosed herein has the advantages that it (1) effectively maintains control of the spark rate of the igniter plugs even in aircraft applications wherein the onboard power source supplies an AC input voltage that varies substantially in both frequency and amplitude, (2) takes up less space, (3) is lighter, and (4) is more robust in the event of the failure of a diode in the rectifier section.

BRIEF DESCRIPTION OF THE DRAWING

An exemplary embodiment of the present invention will hereinafter be described with reference to the appended FIG. 1, which is an electric circuit diagram of an exciter circuit for firing two igniter plugs in gas turbine engines on an aircraft.

DETAILED DESCRIPTION OF THE DISCLOSED EMBODIMENT

Figure 1:
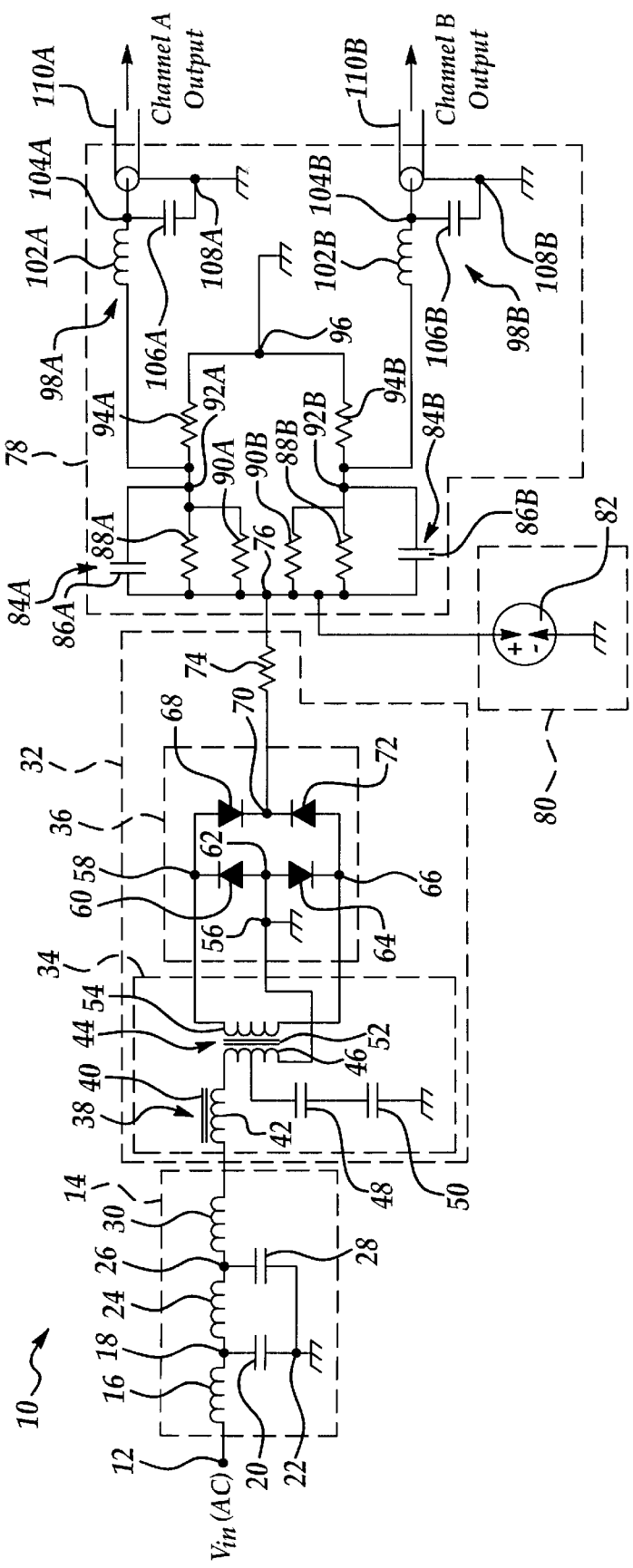

A detailed description of the illustrated embodiment of the present invention is set forth below, beginning with a description of the structure and followed by a discussion of the operation and advantages of that embodiment.
Structure of the Disclosed Embodiment FIG. 1 is an electric circuit diagram illustrating an exciter circuit 10 that is electrically connected between an alternating-current (AC) power source and two igniters. The exciter circuit 10 can be utilized to fire the igniter plugs in an aircraft ignition system, with one igniter plug being, for example, in a first gas turbine engine, and the second being, for example, in a second gas turbine engine such as an afterburner. In general, the exciter circuit 10 serves to step up and transform the AC input voltage received from the power source into a controlled succession of high-voltage ionization pulses. The high-voltage nature of each ionization pulse is designed to cause an ionization current to arc across the air or surface gap between the electrodes of the igniter plug. In this way, each igniter plug is able to properly fire and ignite the air-fuel mixture within its associated turbine engine. As illustrated in FIG. 1, the exciter circuit 10 in general includes an input node 12, an electromagnetic interference (EMI) filter circuit 14, a charging circuit 32, a switch device 80, and a discharge circuit 78.

The input node 12 is electrically connected to an AC power source, such as an AC power bus established onboard the aircraft, that nominally provides 115 Vrms at 400 Hertz, but that can vary within a relatively large range; for example, 90–125 Vrms at 320–480 Hertz. The input node 12 is a part of the EMI filter circuit 14 which is implemented in the illustrated embodiment as a pi network that includes three series-connected inductors 16, 24, and 30 and also two shunt-connected capacitors 20 and 28. The pi network is particularly configured such that the inductor 16 is electrically connected between the input node 12 and a circuit node 18, the inductor 24 is connected between the node 18 and a circuit node 26, and the inductor 30 is connected between node 26 and the charging circuit 32. Capacitor 20 is connected between node 18 and an electrical ground 22 established onboard the aircraft. Similarly, capacitor 28 is connected between node 26 and ground. Given such a configuration, the EMI filter circuit 14 is generally capable of attenuating EMI radiation that might otherwise emanate from the exciter circuit 10 during its operation. As will be appreciated, for a given application, EMI filtering may not be necessary, or where necessary or desirable, EMI filter designs other than a pi network could be used depending upon the amount of EMI reduction desired.

The EMI filter circuit 14 is electrically connected to the charging circuit 32 by way of inductor 30. The charging circuit 32 itself primarily includes a step-up ferro-resonant transformer network 34 and a full-wave rectifier 36. The ferro-resonant transformer network 34 includes a choke coil 38, a step-up transformer 44, and two capacitors 48 and 50. The choke coil 38 can be a tuning (variable-inductance) coil comprising an inductor 42 having a ferromagnetic core 40. The step-up transformer 44 includes a ferromagnetic core 52, a primary winding 46 that is wrapped about the ferromagnetic core 52, and a secondary winding 54 that is also wrapped about the ferromagnetic core 52. At least one of the two capacitors 48 and 50 is preferably a tuning (variable-capacitance) capacitor. The choke coil 38 has a first end indirectly connected to the input node 12 (via the EMI filter circuit 14), and a second end connected one end of the primary winding 46 of the step-up transformer 44. The other end of primary 46 is connected to ground, as shown at circuit node 56. Each of the two ends of the secondary winding 54 are connected to the full-wave rectifier 36 at a circuit nodes 58 and 66. Lastly, the two capacitors 48 and 50 are series-connected and tapped into the primary winding 46 of the step-up transformer 44 such that the two capacitors 48 and 50 are electrically connected between the tap on primary 46 and electrical ground. Given such a configuration, the step-up ferro-resonant transformer network 34 is therefore electrically connected between the input node 12, via the EMI filter circuit 14, and also the full-wave rectifier 36. In this way, the transformer network 34 is able to step up the AC input voltage received from the power source before delivering the voltage to the full-wave rectifier 36.

The full-wave rectifier 36 itself is generally a bridge rectifier that includes four rectifying diodes 60, 64, 68, and 72 that are electrically connected together in a bridge configuration. More particularly, the bridge rectifier is configured such that the cathode of the diode 60, first of all, is electrically connected to electrical ground via both a circuit node 62 and the node 56, and the anode of the diode 60 is electrically connected to the node 58. Second, the diode 64 is electrically connected between electrical ground and the node 66 such that the cathode of the diode 64 is electrically connected to electrical ground via the nodes 62 and 56, and the anode of the diode 64 is electrically connected to the node 66. Third, the diode 68 is electrically connected between the node 58 and a circuit node 70 such that the cathode of the diode 68 is electrically connected to the node 58, and the anode of the diode 68 is electrically connected to the node 70. Fourth, the diode 72 is electrically connected between the node 66 and the node 70 such that the cathode of the diode 72 is electrically connected to the node 66, and the anode of the diode 72 is electrically connected to the node 70. The node 70 is electrically connected to the input node 76 of discharge circuit 78 via a resistor 74.

The discharge circuit has two channels, Channel A and Channel B, each of which is connected to one of the two igniter plugs (not shown). In the description that follows, corresponding parts of the two channels that are shown in FIG. 1 will be identified using the same reference numeral, with either an "A" or a "B" suffix to identify with which channel the part is associated. The input 76 of discharge circuit 78 is directly connected to a first energy storage device 84A, a second energy storage device 84B, and the switch device 80. Both energy storage devices 84A and 84B are in the form of tank (or storage) capacitors 86A and 86B, respectively. Given such a configuration, the full-wave rectifier 36 is therefore electrically connected between the transformer network 34 and both capacitors 86A and 86B. In this way, the full-wave rectifier 36 of the charging circuit 32 is able to rectify the stepped-up AC voltage received from the transformer network 34 before the voltage is utilized to charge up both of the storage capacitors 86A and 86B.

The capacitor 86A is electrically connected between the node 76 and a circuit node 92A of the discharge circuit 78. Thus, the first storage capacitor 86A is capable of storing an electric charge derived from the stepped-up and rectified voltage delivered to the node 76 by the charging circuit 32. Similarly, the second storage capacitor 86B is electrically connected between the node 76 and a circuit node 92B of the discharge circuit 78. Given such, the second capacitor 86B is also capable of storing an electric charge derived from the stepped-up and rectified voltage delivered to the node 76 by the charging circuit 32. In the particular embodiment illustrated in FIG. 1, the first storage capacitor 86A is dedicated to storing an electric charge that will be utilized to specifically fire the igniter plug associated with the first gas turbine engine "Channel A." The second storage capacitor 86B, on the other hand, is dedicated to storing an electric charge that will be utilized to specifically fire the igniter plug associated with the second gas turbine engine "Channel B."

The switch device 80 is electrically connected to both tank capacitor 86A and 86B. In the illustrated embodiment, the switch device 80 comprises a spark gap 82. It is to be understood, however, that many alternative types of known switching devices, such as, for example, a thyristor, silicon-controlled rectifier (SCR), or others, may instead be incorporated within the design of the exciter circuit. As is known, the spark gap is used to allow the storage capacitors 86A and 86B to charge up to a voltage that is sufficient to arc at the igniter plugs. Thus, whenever one of the storage capacitors 86A and 86B are charged by the charging circuit 32 to a voltage level sufficient to arc across the spark gap and igniter, that capacitor discharges through the spark gap 82, firing its corresponding igniter plug.

The discharge circuit 78 itself includes the storage capacitors 86A and 86B, a pair of pulse-forming networks 98A and 98B, and a resistor network which includes two "mirrored" halves, corresponding to the two Channels A and B. The Channel A portion of the resistor network is generally-dedicated to discharging the first storage capacitor 86A to thereby ultimately fire the igniter plug associated with operating the first gas turbine engine. This half of the resistor network is connected to the first pulse-forming network 98A at the node 92A and is particularly configured such that a bleeder resistor 88A and a bleeder resistor 90A are electrically connected in parallel between the node 76 and the node 92A. In addition, the Channel A portion of the resistor network includes a resistor 94A that is electrically connected between the node 92A and electrical ground via a circuit node 96. In contrast, the Channel B half of the resistor network is connected to the second pulse-forming network 98B at the node 92B and is dedicated to discharging the storage capacitor 86B to thereby ultimately fire the igniter plug associated with operating the second gas turbine engine. As with Channel A, this half of the resistor network includes a bleeder resistor 88B and a bleeder resistor 90B that are electrically connected in parallel between the node 76 and the node 92B. The Channel B resistor network also includes a resistor 94B that is electrically connected between the node 92B and electrical ground via the node 96.

The first pulse-forming network 98A of the discharge circuit 78 is used to fashion each discharged electric charge received from the first storage capacitor 86A into a single, high-voltage ionization pulse that will cause the igniter plug associated with operating the first gas turbine engine to fire properly. In the illustrated embodiment, the first pulse-forming network 98A generally comprises an inductor-capacitor peaking network. It is to be understood, however, that many alternative types of known pulse-forming networks (PFNs) can be used instead, such as, for example, those discussed in U.S. Pat. No. 5,852,381 issued to Wilmot et al. on Dec. 22, 1998. The peaking network 98A itself primarily includes both an inductor 102A and a capacitor 106A. The inductor 102A is electrically connected between the node 92A and a high voltage output node 104A, and the capacitor 106A is electrically connected between the node 104A and a circuit node 108A. The node 104A is electrically connected, via the positive conductor of a coaxial igniter lead 110A, to the igniter plug that operates the first gas turbine engine on the aircraft. The node 108A, in turn, is electrically connected between the ground conductor of the coaxial igniter lead 110A and electrical ground.

The second pulse-forming network 98B of the discharge circuit 78 is used to fashion each discharged electric charge received from the second storage capacitor 86B into a single, high-voltage ionization pulse that will cause the igniter plug associated with operating the second gas turbine engine to fire properly. In the illustrated embodiment, the second pulse-forming network 98B generally comprises an inductor-capacitor peaking network. The peaking network 98B itself primarily includes both an inductor 102B and a capacitor 106B. The inductor 102B is electrically connected between the node 92B and a second high voltage output node 104B, and the capacitor 106B is electrically connected between the node 104B and a circuit node 108B. The node 104B is electrically connected, via the positive conductor of a coaxial igniter lead 10B, to the igniter plug that operates the second gas turbine engine on the aircraft. The node 108B, in turn, is electrically connected between the ground conductor of the coaxial igniter lead 110B and electrical ground.

Given such a configuration, the discharge circuit 78 is therefore electrically connected between the spark gap 80 and the two igniter plugs used in the two gas turbine engines on the aircraft. In this way, whenever the storage capacitors are charged by the charging circuit 32 to a predetermined charge level sufficient for firing the igniter plugs, the spark gap 80 is capable of enabling the discharging of the storage capacitors through the discharge circuit 78 and the igniter plugs to create the desired spark.

Operation of the Disclosed Embodiment

As will now be discussed, the exciter 10 is designed to maintain a relatively consistent input current and spark rate over the range of input supply voltages and frequencies that may be encountered in an aircraft ignition system environment. Thus, for example, an AC input voltage with an "effective" voltage varying from 90 to 125 volts (V) and with a frequency varying from 320 to 480 hertz (Hz) is applied to the input node 12 by the power source, the exciter circuit 10 particularly depicted in FIG. 1 should ideally be able to control and regulate the AC input current flowing through the primary winding 46 of the step-up transformer 44 such that the input current generally does not exceed 1 ampere (A) and so that the two igniter plugs each have spark rates generally within the range of 1 to 4 sparks per second. To accomplish such, the choke coil 38, first of all, preferably has an overall inductance tunable up to about 0.05 to 0.06 henries (H) at about 400 Hz and a tunable resistance up to about 2.8 ohms at about 25 degrees Celsius (° C.). Discounting the effect of the ferromagnetic core 40 of the choke coil 38, the inductor coil 42 alone preferably has an overall inductance tunable up to about 1.1 milli-henries (mH) at about 120 Hz. Next, regarding the step-up transformer 44, the primary winding 46 preferably has an inductance of about 160 mH at about 400 Hz and a resistance of about 1 ohm. The secondary winding 54, on the other hand, preferably has an inductance of about 50 H at about 400 Hz and a resistance of about 2.2 kilo-ohms. The step-up turns ratio between the secondary winding 54 and the primary winding 46 about the ferromagnetic core 52 is about 30-to-1 (i.e., 30:1). Lastly, the capacitors 48 and 50 are each preferably tuned to about 0.5 micro-farads (uF).

During operation of the exciter circuit 10, after the AC input voltage is applied to the input node 12, the voltage is first filtered through the EMI filter circuit 14 before passing on to the step-up ferro-resonant transformer network 34 of the charging circuit 32. The choke coil 38 and the capacitors 48 and 50 together generally establish an ideal resonant or "center" frequency of about 400 Hz for the overall operation of the step-up ferro-resonant transformer network 34. In doing so, the choke coil 38 generally never becomes saturated and the capacitors 48 and 50 generally function as resonant capacitors. In contrast to the choke coil 38, the primary winding 46 of the step-up transformer 44 often becomes saturated during operation and therefore commonly operates in saturation by intentional design. In doing so, the primary winding 46 is able to both regulate and limit excessively high input currents that at times attempt to flow through the primary winding 46 of the step-up transformer 44 due to input voltages that have both a high frequency and a large amplitude. In general, the resistor/inductor/capacitor (RLC) characteristics dictated by the particular inductance and resistance of the choke coil 38, the particular capacitances of both the resonant capacitors 48 and 50, and the particular inductance and resistance of the primary winding 46 together largely control the overall input current regulation characteristics of the step-up ferro-resonant transformer network 34. Hence, as input voltages of varying frequencies and amplitudes are passed on to the step-up ferro-resonant transformer network 34, an effective bandwidth for operating the overall exciter circuit 10 in response to such input voltages is established. In this way, when the step-up ferro-resonant transformer network 34 is operated over this bandwidth, the stepped-up and resultant output voltage across the secondary winding 54 of the step-up transformer 44 is effectively regulated as well via a linear shift with regard to any shift in the operating frequency of the input voltage. Thus, for example, if a filtered AC input voltage of 115 volts is received by the step-up ferro-resonant transformer network 34, a regulated and stepped-up AC output voltage of about 2800 volts is induced across the secondary winding 54 of the step-up transformer 44.

After the AC input voltage is stepped up in this manner, the resultant AC output voltage across the secondary winding 54 is then fully rectified by the full-wave rectifier 36 of the charging circuit 32. Once rectified, the resultant voltage is utilized to charge up the tank capacitor 86A (i.e., the first energy storage device 84A) via a charging path defined through the node 70, the resistor 74, the node 76, the node 92A, the resistor 94A, and the node 96 to electrical ground. At the same time, the resultant voltage is also utilized to charge up the tank capacitor 86B (i.e., the second energy storage device 84B) via a charging path defined through the node 70, the resistor 74, the node 76, the node 92B, the resistor 94B, and the node 96 to electrical ground. Preferably, each of the tank capacitors 86A and 86B can store up to 11 joules of electric charge energy. Because the rectified voltage utilized to charge up both tank capacitors 86A and 86B is derived from the properly regulated AC output voltage across the secondary winding 54 of the step-up transformer 44, neither the tank capacitor 86A nor the tank capacitor 86B is ever charged up prematurely. In this way, the charging times of both tank capacitors 86A and 86B are generally limited to each being within a preferred range of about 0.25 up to 0.75 seconds over both the entire frequency and voltage ranges of the input voltage supplied by the power source at the input node 12.

Once the tank capacitors 86A and 86B have each accumulated a stored electric charge that corresponds to a predetermined charge level of about 3500 volts, the spark gap device 82 (i.e., the switch device 80) arcs, thereby allowing one or both of the tank capacitors 86A and 86B to quickly discharge their stored charges through the discharge circuit 78 to the igniter plugs. More particularly, the tank capacitor 86A is effectively discharged via a discharge path defined through the node 92A, the pulse-forming network 98A, and the coaxial igniter lead 110A to the igniter plug associated with operating the first gas turbine engine "A." At the same time, the tank capacitor 86B is effectively discharged via a discharge path defined through the node 92B, the pulse-forming network 98B, and the coaxial igniter lead 110B to the igniter plug associated with operating the second gas turbine engine "B." The first pulse-forming network 98A fashions each discharged electric charge received from the tank capacitor 86A into a single, high-voltage ionization pulse that causes the igniter plug associated with operating the first gas turbine engine "A" to fire properly. Likewise, the second pulse-forming network 98B fashions each discharged electric charge received from the tank capacitor 86B into a single, high-voltage ionization pulse that causes the igniter plug associated with operating the second gas turbine engine "B" to fire properly as well.

As a result of the particular configuration set forth hereinabove for the exciter circuit 10, experimentation has demonstrated that, for a variable input of 90–125 Vrms at 320–480 Hertz, the input current to the exciter 10 can be successfully controlled and limited by the step-up ferro-resonant transformer network 34 to less than 0.6 amperes. Furthermore, experimentation has also demonstrated that the resultant spark rates of the two igniter plugs associated with operating the first and second gas turbine engines "A" and "B" can be successfully maintained within a range of 1 to 3 sparks per second. In light of such, the exciter circuit 10 can be used to effectively maintain control of the spark rates of the igniter plugs even in aircraft applications wherein the onboard power source supplies an AC input voltage that varies in both frequency and amplitude. As a result, smooth and proper operation of the first and second gas turbine engines "A" and "B" is realized with the exciter circuit 10.

In addition to being able to control both input currents and spark rates, the step-up ferro-resonant transformer network 34 in combination with the full-wave rectifier 36 of the exciter circuit 10 generally takes up less space and is generally lighter (i.e., weighs less) than the prior art linear transformer in combination with a voltage doubler. Such inherent size and weight characteristics can be desirable, especially in aviation and aerospace applications.

Furthermore, by incorporating the step-up ferro-resonant transformer network 34 in combination with the full-wave rectifier 36 within the exciter circuit 10, the exciter may not be rendered inoperable by the failure of a single diode. That is, if only one of the four diodes 60, 64, 68, and 72 within the full-wave rectifier 36 fails, the overall exciter circuit 10 is still able to generally function properly.

Lastly, although the exciter circuit according to the present invention is ideally suitable for aviation and aerospace applications, it is to be understood that the inventive ideas as taught and claimed herein regarding and underlying the exciter circuit do not limit the exciter circuit to only being utilized in aviation and aerospace applications. Furthermore, it is to be understood that the exciter circuit may be easily adapted so as to be operable in applications involving one or any number of gas turbine engines instead of only applications involving two gas turbine engines.

While a particular embodiment of the present invention has been described herein, it is to be understood that the appended claims are not to be limited to the disclosed embodiment but, on the contrary, are intended to cover various modifications and equivalent arrangements, and the claims are to be accorded a scope that is broad enough so as to encompass all such modifications and equivalent structures as is permitted under the law.

What is claimed is:

1. An exciter circuit for firing at least one igniter plug, comprising:
   an energy storage device;
   a charging circuit having an input, an output, and a ferro-resonant transformer network that includes a saturating transformer with a primary winding connected to said input and a secondary winding connected to said output, said transformer network further including an inductive coil in series with said primary winding and a capacitor connected to said primary winding; and
   a discharge circuit having a high voltage output connected to said energy storage device;
   wherein operating power received by said charging circuit via said input is stored in said energy storage device; and
   wherein said ferro-resonant transformer network has a resonant frequency that is determined at least in part by the inductance of said coil and the capacitance of said capacitor and wherein, during operation of said exciter circuit, current flow through said coil and said primary causes saturation of said transformer.

2. An exciter circuit as defined in claim 1, wherein said input can be connected to an AC supply having a frequency that varies over a range of values, and wherein said resonant frequency is set at a frequency that is within said range of values.

3. An exciter circuit as defined in claim 1, wherein said primary winding is connected between said coil and ground, and wherein said capacitor is connected to a tap in said primary winding.

4. An exciter circuit as defined in claim 3, wherein said capacitor comprises a tuning capacitor.

5. An exciter circuit as defined in claim 4, further comprising a second capacitor is series with said tuning capacitor.

6. An exciter circuit as defined in claim 1, wherein said primary winding has a higher inductance than said coil and wherein, during operation, current flow through said coil and said primary winding causes saturation of said transformer while said coil remains unsaturated.

7. An exciter circuit as defined in claim 1, wherein said transformer comprises said energy storage device, whereby said charging circuit includes said energy storage device.

8. An exciter circuit as defined in claim 1, wherein said energy storage device comprises a storage capacitor connected to said secondary winding.

9. An exciter circuit as defined in claim 8, further comprising a full wave rectifier connected between said secondary winding and said storage capacitor.

10. An exciter circuit as defined in claim 9, further comprising a switch device that operates to discharge said storage capacitor through the igniter plug when the storage capacitor is charged up to a predetermined voltage level.

11. An exciter circuit as defined in claim 10, wherein said switch device comprises a spark gap.

12. An exciter circuit as defined in claim 8, further comprising a second storage capacitor, wherein each of said storage capacitors are connected to a separate output lead of said exciter circuit to deliver energy from said storage capacitors to two different igniter plugs.

13. An exciter circuit as defined in claim 8, wherein said discharge circuit includes said storage capacitor, a spark gap, and a pulse forming network connected in circuit such that, when an igniter is connected between said high voltage output and a ground connection, said storage capacitor discharges through a path that includes said spark gap, said pulse forming network, and the igniter.

14. An exciter circuit for firing at least one igniter plug in an ignition system suitable for operating at least one gas turbine engine on an aircraft, said exciter circuit comprising:
   an input node capable of receiving an alternating-current voltage having a variable frequency and a variable amplitude;
   at least one energy storage device capable of storing an electric charge;
   a charging circuit capable of electrically charging said energy storage device, said charging circuit including a step-up ferro-resonant transformer network and a full-wave rectifier, wherein said step-up ferro-resonant transformer network is electrically connected between said input node and said full-wave rectifier, and said full-wave rectifier is electrically connected between said step-up ferro-resonant transformer network and said energy storage device;

a discharge circuit electrically connected to said energy storage device and electrically connectable to said at least one igniter plug; and a switch device electrically connected to at least one of said energy storage device and said discharge circuit;

wherein said switch device is capable of enabling the discharging of said energy storage device through said discharge circuit and also the firing of said at least one igniter plug whenever said energy storage device is charged by said charging circuit to a predetermined charge level sufficient for firing said at least one igniter plug.

15. The exciter circuit according to claim 14, said exciter circuit further comprising a filter circuit electrically connected between said input node and said charging circuit and capable of attenuating electromagnetic interference radiation emanating from said exciter circuit.

16. The exciter circuit according to claim 15, wherein said filter circuit comprises a pi network including three series-connected inductors and two shunt-connected capacitors.

17. The exciter circuit according to claim 14, wherein said at least one energy storage device is a tank capacitor.

18. The exciter circuit according to claim 14, wherein said step-up ferro-resonant transformer network includes:

a choke coil having a first end and a second end, wherein said first end of said choke coil is electrically connected to said input node;

a step-up transformer having a ferromagnetic core, a primary winding wrapped about said ferromagnetic core, and a secondary winding wrapped about said ferromagnetic core, wherein said primary winding has a first end electrically connected to said second end of said choke coil and a second end electrically connectable to electrical ground, and said secondary winding has a first end and a second end both electrically connected to said full-wave rectifier; and at least one capacitor tapped into said primary winding such that said at least one capacitor is electrically connectable between said primary winding and electrical ground.

19. The exciter circuit according to claim 18, wherein said choke coil is a ferromagnetic-core inductor.

20. The exciter circuit according to claim 18, wherein said choke coil is a tuning coil having a ferromagnetic core.

21. The exciter circuit according to claim 18, wherein said at least one capacitor includes at least one tuning capacitor.

22. The exciter circuit according to claim 14, wherein said full-wave rectifier includes four diodes electrically connected together in a bridge configuration.

23. The exciter circuit according to claim 14, wherein said discharge circuit includes at least one bleeder resistor electrically connected to said energy storage device.

24. The exciter circuit according to claim 23, wherein said discharge circuit includes at least one pulse-forming network electrically connected to said bleeder resistor and electrically connectable to said igniter plug.

25. The exciter circuit according to claim 24, wherein said at least one pulse-forming network is an inductor-capacitor peaking network.

26. The exciter circuit according to claim 14, wherein said switch device is a spark gap device.

* * * * *